United States Patent
Kong et al.

(10) Patent No.: US 10,374,246 B2
(45) Date of Patent: Aug. 6, 2019

(54) ION EXCHANGE MEMBRANE AND MANUFACTURING METHOD THEREFOR

(71) Applicants: Hyundai Electric & Energy Systems Co., Ltd., Seoul (KR); Postech Academy-Industry Foundation, Gyeongsangbuk-do (KR)

(72) Inventors: Ji Hyun Kong, Ulsan (KR); Jung Yun Kim, Gyeongsangnam-do (KR); Eun Jung Choi, Gwangju (KR); Moon Jeong Park, Gyeongsangbuk-do (KR); Il Young Choi, Gyeongsangbuk-do (KR); Sung Yeon Kim, Gyeongsangbuk-do (KR); Ho Il Lee, Ulsan (KR)

(73) Assignee: Hyundai Electric & Energy Systems Co., Ltd., Seoul (KR)

( * ) Notice: Subject to any disclaimer, the term of this patent is extended or adjusted under 35 U.S.C. 154(b) by 273 days.

(21) Appl. No.: 15/038,814

(22) PCT Filed: Nov. 25, 2014

(86) PCT No.: PCT/KR2014/011368
§ 371 (c)(1),
(2) Date: May 24, 2016

(87) PCT Pub. No.: WO2015/076641
PCT Pub. Date: May 28, 2015

(65) Prior Publication Data
US 2016/0380297 A1    Dec. 29, 2016

(30) Foreign Application Priority Data

Nov. 25, 2013  (KR) .................. 10-2013-0144053
Oct. 21, 2014  (KR) .................. 10-2014-0142475

(51) Int. Cl.
| | |
|---|---|
| H01M 8/1023 | (2016.01) |
| H01M 8/20 | (2006.01) |
| H01M 8/1072 | (2016.01) |
| H01M 8/18 | (2006.01) |
| C08J 5/22 | (2006.01) |

(52) U.S. Cl.
CPC ......... *H01M 8/1023* (2013.01); *C08J 5/2243* (2013.01); *H01M 8/1072* (2013.01); *H01M 8/188* (2013.01); *C08J 2353/02* (2013.01); *Y02E 60/528* (2013.01); *Y02P 70/56* (2015.11)

(58) Field of Classification Search
CPC .. H01M 8/1023; H01M 8/1072; H01M 8/188; C08J 2353/02; C08J 5/2243; Y02E 60/528; Y02P 70/56
See application file for complete search history.

(56) References Cited

U.S. PATENT DOCUMENTS

| | | | |
|---|---|---|---|
| 7,842,410 B2 | 11/2010 | Lee et al. | |
| 8,993,192 B2 | 3/2015 | Ono et al. | |
| 9,054,357 B2 | 6/2015 | Kim et al. | |
| 2009/0148744 A1* | 6/2009 | Fehervari | H01M 8/10 429/33 |
| 2010/0081029 A1* | 4/2010 | Fukuta et al. | H01M 8/10 429/33 |
| 2011/0171561 A1* | 7/2011 | Pillai | H01B 1/04 429/492 |

FOREIGN PATENT DOCUMENTS

| | | |
|---|---|---|
| JP | 2007-103375 A | 4/2007 |
| JP | 2012-015118 A | 1/2012 |
| KR | 10-2007-0098323 A | 10/2007 |
| KR | 10-2009-0044315 A | 5/2009 |
| KR | 10-2011-0128817 A | 11/2011 |
| KR | 10-2013-0040022 A | 4/2013 |
| KR | 10-2013-0048519 A | 5/2013 |

OTHER PUBLICATIONS

C. Y. Du, T. S. Zhao, Z. X. Liang. Sulfonation of carbon-nanotube supported platinum catalysts for polymer electrolyte fuel cells, Journal of Power Sources 176 (2008) 9-15.*
H. Yu, Y. Jin, Z. Li, F. Peng, H. Wang. Synthesis and characterization of sulfonated single-walled carbon nanotubes and their performance as solid acid catalyst, Journal of Solid State Chemistry 181 (2008) 432-438.*
F. Weng et al., "Direct Polymerization of Sulfonated Poly(arylene ether sulfone) Random (Statistical) Copolymers: Candidates for New Proton Exchange Membranes", Journal of Membrane Science, 2002, vol. 197, pp. 231-242.
G. Alberti et al., "Polymeric Proton Conducting Membrane for Medium Temperature Fuel Cells (110-160° C.)", Journal of Membrane Science, 2001, vol. 185, pp. 73-81.
Y. S. Kim et al., "Direct Methanol Fuel Cell Performance of Disulfonated Poly(arylene ether benzonitrile) Copolymers", Journal of the Electrochemical Society, 2004, vol. 151, No. 12, pp. A2150-A2156.
F. Weng et al., "Synthesis of Highly Sulfonated Poly(arylene ether sulfone) Random (Statistical) Copolymers Via Direct Polymerization", Macromolecular Symposia, 2001, vol. 175, pp. 387-395.

(Continued)

*Primary Examiner* — Carlos Barcena
(74) *Attorney, Agent, or Firm* — Blank Rome LLP

(57) ABSTRACT

The present invention relates to an ion exchange membrane and a manufacturing method therefor and, more specifically, to an ion exchange membrane comprising a cross-linked sulfonated triblock copolymer and carbon nanotube, which is utilizable in a redox flow energy storage device, etc. due to high ion conductivity, mechanical strength and ion selectivity. The ion exchange membrane of the present invention has superior ion selectivity and mechanical strength and thus can greatly improve the performance of a fuel battery, etc. when applied thereto.

15 Claims, 7 Drawing Sheets

(56) References Cited

OTHER PUBLICATIONS

S. Gu et al., "Synthesis and Characteristics of Sulfonated Poly(phthalazinone ether sulfone ketone) (SPPESK) for Direct Methanol Fuel Cell (DMFC)", Journal of Membrane Science, 2006, vol. 281, pp. 121-129.
N.P. Balsara et al., "Effect of Saturation on Thermodynamics of Polystyrene-Polyisoprene Block Copolymers", Macromolecules, 1994, vol. 27, pp. 1216-1220.
J. Yeo et al., "Mechanically and Structurally Robust Sulfonated Block Copolymer Membranes for Water Purification Applications", Nanotechnology, 2012, vol. 23, 245703, pp. 1-11.

\* cited by examiner

ION EXCHANGE MEMBRANE AND MANUFACTURING METHOD THEREFOR

TECHNICAL FIELD

The present invention relates to an ion exchange membrane and a manufacturing method therefor. More specifically, the present invention relates to an ion exchange membrane including a cross-linked sulfonated triblock copolymer, which is utilizable in a redox flow battery or fuel cell by virtue of high ion conductivity, mechanical strength and ion selectivity, and a manufacturing method therefor.

BACKGROUND ART

An ion exchange membrane is one having a cation exchange group in itself to allow selective permeation of ions and is used in the field of electrodialysis, diffusion dialysis, fuel cells, or the like. Particularly, in the field of fuel cells, an ion exchange membrane is used widely for polymer electrolyte membrane fuel cells (PEMFC), direct methanol fuel cells (DMFC), redox flow batteries (RFB), or the like. An ion exchange membrane provided with lower electrical resistance, higher selective ion permeability, higher chemical stability and higher mechanical strength has higher utility.

Most of commercially available ion exchange membranes include a fluoropolymer having a cation exchange group introduced thereto, and typical examples of such cation exchange membranes include Nafion available from DuPont, Dow membranes available from Dow Chemicals, Aciplex-S membranes available from Asahi Chemicals, and Flemion membranes available from Asahi glass. Particularly, Nafion™ includes a sulfonate group introduced to a polytetrafluoroethylene backbone, and has an ion conductivity of 0.1 S/cm under its saturated moisture content, high mechanical strength and chemical resistance. Thus, it has been used widely as an electrolyte separator in a vanadium redox flow battery. However, Nafion is expensive, requires a complicated fluorine substitution process, and has low ion selectivity. Therefore, active studies have been conducted to develop a polymer capable of substituting for Nafion.

The results of studies that have been conducted to date include ion exchange membranes developed by using non-fluoropolymers and polymers partially substituted with fluorine. Typical examples of such ion exchange membranes include those using polymers based on sulfonated poly(phenylene oxide), poly(phenylene sulfide), polysulfone, poly(para-phenylene), polyetherether ketone, polyimide, or the like (see J. Membr. Sci., 197 (2002) 231; J. Membr. Sci., 185 (2001) 73; J. Electrochem. Soc., 151 (21) (2004) A2150; Micromol. Symp., 175 (2001) 387; J. Membr. Sci., 281 (2006) 121, or the like). For example, Korean Laid-Open Patent No. 2007-0098323 (2007 Oct. 5) discloses a composite electrolyte membrane, including: a first polymer electrolyte layer containing a first non-fluorinated or partially fluorinated sulfonated polymer electrolyte; a non-fluorinated or partially fluorinated microporous polymer substrate disposed on the first polymer electrolyte layer, wherein the pores of the microporous polymer substrate are impregnated with a second non-fluorinated or partially fluorinated polymer electrolyte in such a manner that the first polymer electrolyte is entangled with the second polymer electrolyte on the interface; and a third polymer electrolyte layer disposed on the microporous polymer substrate impregnated with the second polymer electrolyte and containing a third non-fluorinated or partially fluorinated sulfonated polymer electrolyte in such a manner that the second polymer electrolyte is entangled with the third polymer electrolyte on the interface. In addition, Korean Laid-Open Patent No. 2009-0044315 (2009 May 7) discloses a polymer composite electrolyte membrane for a fuel cell, including: a polytetrafluoroethylene microporous membrane impregnated with a non-fluorinated sulfonated polymer electrolyte; and non-fluorinated sulfonated polymer electrolyte layers provided on both surfaces of the polytetrafluoroethylene microporous membrane impregnated with a non-fluorinated sulfonated polymer electrolyte. However, an ion exchange membrane using a sulfonated polymer inevitably undergoes degradation of ion conductivity when it is sulfonated to a concentration higher than its critical concentration, and also undergoes degradation of mechanical properties upon hydration. Thus, such an ion exchange membrane using a sulfonated polymer cannot be used for a long time. In addition, it shows higher electrical resistance as compared to a commercially available membrane, such as Nafion, and thus cannot have a desired level of ion conductivity.

Meanwhile, some studies have been conducted to apply carbon nanotubes (CNT) having a high aspect ratio (300-1000) and excellent mechanical strength (150-180 GPa) to an ion exchange membrane in order to solve the problem of degradation of mechanical properties occurring when an ion exchange membrane is manufactured by using a non-fluorinated polymer. For example, Korean Laid-Open Patent No. 2013-0040022 (2013 Apr. 23) discloses a polymer electrolyte membrane including an ion conductive polymer having an ion conductive functional group, carbon nanotubes having an ion conductive functional group, and a cross-linking agent, a method for manufacturing the same and a fuel cell including the same.

Under these circumstances, the present inventors have conducted many studies to develop an ion exchange membrane having excellent ion conductivity, chemical stability and mechanical strength while also providing high ion selectivity. As a result, the present inventors have found that it is possible to obtain an ion exchange membrane having an ion conductivity and ion selectivity equal to or higher than the ion conductivity and ion selectivity of a commercially available product, when a triblock copolymer is prepared by using a non-fluorinated polymer with a controlled sulfonation degree and cross-linking degree. The present inventors have also found that an ion exchange membrane can resist extra pressure generated by the flow of a solution in a flow battery, when the molecular weight of the ion exchange membrane is increased to improve its mechanical strength. The present invention is based on these findings.

Technical Problem

A technical problem to be solved by the present invention is to provide an ion exchange membrane having high ion conductivity, chemical stability, mechanical strength and ion selectivity, and a manufacturing method therefor. Another technical problem to be solved by the present invention is to provide a redox flow battery or fuel cell using the ion exchange membrane. Still another technical problem to be solved by the present invention is to provide an ion exchange membrane which does not undergo deterioration of performance even in a flow battery as compared to the conventional static battery, and a manufacturing method therefor.

Technical Solution

In one general aspect, there is provided an ion exchange membrane including a cross-linked sulfonated triblock copolymer. According to an embodiment, the triblock copolymer may be a non-fluoropolymer in which a first sulfonated block, a cross-linking block and a second sulfonated block are arranged sequentially.

According to another embodiment, the first sulfonated block and the second sulfonated block may be the same or different blocks.

According to still another embodiment, the sulfonated block may be a polystyrene (PS) block.

According to still another embodiment, the cross-linking block may be a polyisoprene (PI) block.

According to still another embodiment, the cross-linking of the cross-linked sulfonated triblock copolymer may be formed merely in the cross-linking block.

According to still another embodiment, the cross-linking block may have a cross-linking degree of 0.5-5% but is not limited thereto. Although there is no limitation in value of cross-linking degree, a higher cross-linking degree generally provides higher mechanical strength. However, when the cross-linking block has a high cross-linking degree of 5% or more, it is not dissolved in a solvent, resulting in poor processability. Therefore, the above-defined range is suggested so that mechanical strength may be improved while not causing any problem related with solubility.

According to still another embodiment, the sulfonation of the cross-linked sulfonated triblock copolymer may be carried out in the sulfonated blocks.

According to still another embodiment, the sulfonated block may have a sulfonation degree of 25-65% but is not limited thereto. Since a higher sulfonation degree provides more sulfonate groups in the polymer, it is possible to provide improved conductivity. However, when the sulfonation degree is less than 25%, the block copolymer has too low conductivity to be used as an ion exchange membrane. On the other hand, when the number of sulfonate groups is increased, the block copolymer has increased hydrophilicity and absorbs a larger amount of water, resulting in an increase in swelling degree and degradation of durability. Thus, the above-defined range (25% or higher and less than 65%) is suggested to prevent such problems.

According to still another embodiment, each single monomer block of the block copolymer may have a molecular weight of 20-150 kg/mol.

According to still another embodiment, the ion exchange membrane may further include carbon nanotubes (CNT) but is not limited thereto. Preferably, the carbon nanotubes may be sulfonated carbon nanotubes. According to still another embodiment, the sulfonated carbon nanotubes may include 0.1-70 parts by weight of sulfonate groups based on 100 parts by weight of the carbon nanotubes.

According to yet another embodiment, the carbon nanotubes may be present in an amount of 1-5 parts by weight based on 100 parts by weight of the ion exchange membrane.

In another aspect, there is provided a redox flow battery including the ion exchange membrane. The redox flow battery may be a vanadium redox flow battery but is not limited thereto.

In still another aspect, there is provided a fuel cell including the ion exchange membrane.

In still another aspect, there is provided a method for manufacturing the ion exchange membrane. The method for manufacturing an ion exchange membrane according to the present invention includes the steps of: forming a triblock copolymer in which a first sulfonated block, cross-linking block and a second sulfonated block are arranged sequentially; hydrogenating a part of the doubles bonds of the cross-linking block; sulfonating at least one of the sulfonated blocks; and carrying out cross-linking of the cross-linking block to obtain a cross-linked sulfonated triblock copolymer.

According to an embodiment, the crosslinking and sulfonation may be carried out simultaneously by using acetic sulfate.

According to another embodiment, the method may further include a step of adding sulfonated carbon nanotubes to the cross-linked sulfonated triblock copolymer.

According to still another embodiment, the sulfonated carbon nanotubes may be obtained by mixing carbon nanotubes with aqueous ammonium sulfate and heating the mixture at a temperature of 200-250° C. for 25-40 minutes.

Advantageous Effects

The ion exchange membrane according to the present invention has improved ion selectivity while providing ion conductivity, mechanical strength and chemical stability equal to those of commercially available Nafion. In addition, it has been found that addition of sulfonated carbon nanotubes to the cross-linked sulfonated triblock copolymer improves both the mechanical strength and ion conductivity of an ion exchange membrane at the same time. It has also been found that when the proportion of a monomer and that of an initiator are controlled to increase the molecular weight of an ion exchange membrane, the ion exchange membrane has increased mechanical strength, and provides a battery with improved battery capacity and a stable charge/discharge curve. Therefore, the ion exchange membrane according to the present invention can be applied advantageously for a redox flow battery or fuel cell.

DETAILED DESCRIPTION OF THE BEST MODE

Figure 1:
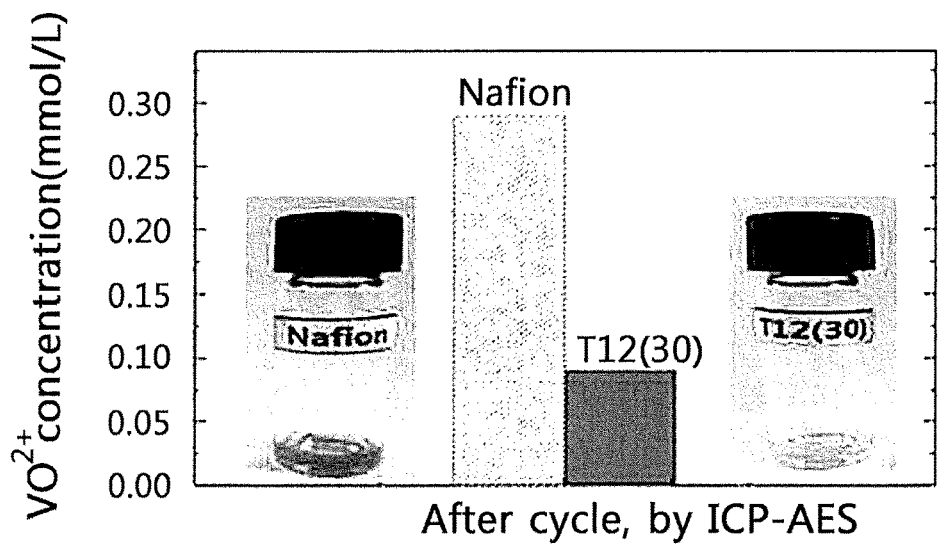
FIG. 1 is a graph illustrating the $V^{4+}$ ion concentration remaining in the separator after subjecting a battery using each of T12(30) according to an embodiment of the present invention and Nafion as control to charging/discharging in order to determine the ion selectivity of the ion exchange membrane according to the present invention.

Exemplary embodiments now will be described more fully hereinafter.

Most of commercially available ion exchange membranes include a fluoropolymer to which a cation exchange group is introduced, and requires high manufacturing cost due to a complicated fluorine substitution process during the manufacture. Thus, the inventors of the present invention have conducted many studies to develop an ion exchange membrane having chemical stability, ion conductivity and mechanical strength equal to or higher than those of commercially available products, while reducing manufacturing cost. In the studies, the type and structure of a polymer, sulfonation or cross-linking degrees, type and proportion of an additive, etc. have been optimized.

The ion exchange membrane according to the present invention includes a triblock copolymer. According to an embodiment, the triblock copolymer includes a first sulfonated block, cross-linking block and a second sulfonated block arranged sequentially. The reason why the cation exchange membrane according to the present invention has the form of a triblock is that ion conductivity is reduced significantly and entanglement among the polymer chains is less effective as compared to a triblock form, in the case of a diblock form, and thus it is not possible to provide high mechanical strength by the screw- or ladder-like structure formed on a membrane. According to another embodiment, the triblock copolymer has a cross-linking block between the first and the second sulfonated blocks to which ion exchange groups are introduced. This is directed to providing an ion exchange membrane having improved chemical stability and mechanical strength, while improving ion conductivity and ion selectivity. According to still another embodiment, the first sulfonated block and the second sulfonated block may be the same or different materials.

As used herein, the term 'sulfonated block' means a predetermined segment of the triblock copolymer having pendant sulfonate groups introduced thereto. When applying the ion exchange membrane to a redox flow battery, it is preferred that only sulfonate groups are introduced to the sulfonated blocks, but the present invention is not limited thereto. Therefore, depending on particular use, a carboxylate group, phosphate group, phosphonate group or a derivative thereof may be introduced to the sulfonated block, in addition to sulfonate groups.

As used herein, the term 'cross-linking block' means a predetermined segment linked in the middle of the triblock copolymer to improve mechanical strength in aqueous solution. According to a preferred embodiment, the crosslinking is formed merely in the cross-linking block. This is directed to minimizing the problem of a decrease in ion conductivity of about 20-50%, caused by a cross-linking process limiting the relaxation of a polymer chain.

In the sulfonated blocks and cross-linking block according to the present invention, the same material or different materials may be used. Particular examples of such materials may include a conventionally used fluoropolymer, benzimidazole polymer, polyester imide polymer, polyphenylene sulfide polymer, polysulfone polymer, polyethersulfone polymer, polyetherketone polymer, polyether-ether ketone polymer or polyphenylquinoxaline polymer, but are not limited thereto. More particularly, there may be used poly (perfluorosulfonic acid), poly(perflurocarboxylic acid), a copolymer of tetrafluoroethylene with fluorovinyl ether containing sulfonate groups, sulfated polyether ketone, aryl ketone, poly[2,2'-m-phenylene]-5,5'-bibenzimidazole] or poly(2,5-benzimidazole), or the like, but the present invention is not limited thereto. However, it is preferred that no fluoropolymer is used according to the present invention in order to simplify the manufacturing process and to reduce the manufacturing cost as compared to commercially available products. According to a preferred embodiment, a polystyrene (PS) block may be used in the sulfonated blocks. According to another embodiment, a polyisoprene (PI) block may be used in the cross-linking block.

As used herein, the term 'sulfonation degree' means a molar percent of sulfonate substituted in the sulfonated block. The sulfonation degree may be controlled considering mechanical strength and ion conductivity including crossover. According to an embodiment, it is preferred that the sulfonation degree is 25-65%. When the sulfonation degree is less than 25%, ion conductivity is decreased. When the sulfonation degree is higher than 65%, swelling occurs in a solvent, such as water, resulting in degradation of mechanical strength. Meanwhile, the cross-linking degree in the cross-linking block may be determined by controlling the content of double bonds in the cross-linking block considering mechanical properties and ion conductivity. The content of double bonds may be controlled through the hydrogenation of the cross-linking block. In general, a diblock copolymer undergoes hydrogenation to about 90% during the first reaction of cross-linking, while a triblock copolymer undergoes hydrogenation merely to about 80%. Therefore, it is possible to carry out cross-linking reaction repeatedly to a desired level of hydrogenation. According to an embodiment, it is preferred that the cross-linking degree in the cross-linking block is 0.5-5%.

Meanwhile, the ion exchange membrane according to the present invention may be used in various industrial fields where selective ion exchange is required. For example, the ion exchange membrane according to the present invention may be used as an electrolyte membrane for a fuel cell. A fuel cell is a device by which chemical energy generated by oxidation is converted into electric energy. A hydrogen fuel cell uses hydrogen as fuel and oxygen as oxidant. In addition, a hydrogen fuel cell may use hydrocarbon or alcohol as fuel and air, chlorine or chlorine dioxide as oxidant. Fuel cells may be classified into molten carbonate fuel cells, polymer electrolyte fuel cells, solid oxide fuel cells, direct methanol fuel cells, direct ethanol fuel cells, phosphoric acid fuel cells, or the like, depending on the type of electrolyte used therein. Particular examples of fuel cells to which the ion exchange membrane according to the present invention may be applied include Polymer Electrolyte Membrane fuel cells (PEMFC), Direct Methanol Fuel Cells (DMFC), or the like, but are not limited thereto. The fuel cell to which the ion exchange membrane according to the present invention is applied includes a cathode, anode and an ion exchange membrane disposed between the cathode and anode. The cathode is a place where reduction of oxygen occurs and may include a catalyst having catalyst particles and cation exchange groups to stimulate the reduction. The anode is a place where oxidation of fuel occurs and may include a catalyst having catalyst particles and cation exchange groups to stimulate the oxidation. The catalyst used for the cathode and anode may include catalytic metal particles and a catalyst support, and may be in contact with the ion exchange membrane according to the present invention. In addition, the fuel cell to which the ion exchange membrane according to the present invention may be applied optionally further includes various components known to those skilled in the art. In addition, the ion exchange membrane according to the present invention may be used as an electrolyte membrane for a redox flow battery, particularly for a vanadium redox flow battery. A vanadium redox flow battery (VRFB) means a secondary battery storing chemical energy by using four types of vanadium ions having different oxidation states. Such a vanadium redox flow battery includes: a cell including an ion exchange membrane, two electrolytes separated from each other by the ion exchange membrane and electrodes; a cathode electrolyte storage tank and an anode electrolyte storage tank connected to each of the electrolytes; and a pump connected to the cell and storage tanks to carry out circulation of the electrolytes during charge and discharge. In a VRFB, an ion exchange membrane exists in a state where it is always immersed in an electrolyte solution and has higher possibility of undergoing degradation of quality due to oxidation, etc., and thus requires mechanical strength and physical durability.

To increase the mechanical strength and durability of an ion exchange membrane, there is provided an ion exchange membrane including a cross-linked sulfonated triblock copolymer and sulfonated carbon nanotubes (CNT) according to an aspect of the present invention.

According to the present invention, commercially available carbon nanotube products may be used. Particularly, both single-walled nanotubes (SWNT) and multi-walled nanotubes (MWNT) having high crystallinity through the secondary growth of SWNT may be used.

The carbon nanotubes used in the present invention have low dispersibility due to their hydrophobicity, thereby reducing the ion conductivity of a membrane. Therefore, to overcome such a problem, the surface of carbon nanotubes is substituted with at least one cation exchange group selected from a sulfonate group, carboxylate group, phosphate group, phosphonate group, hydroxyl group and derivatives thereof according to an embodiment of the present invention. More preferably, a sulfonate group is used. According to an embodiment of the present invention, the sulfonate groups in the sulfonated carbon nanotubes may be present in an amount of 0.1-70 parts by weight based on 100 parts by weight of carbon nanotubes. When sulfonate groups are present in an amount less than 0.1 parts by weight, it is not possible to improve ion conductivity sufficiently. When sulfonate groups are present in an amount larger than 70 parts by weight, improvement of mechanical properties is decreased without any additional increase in ion conductivity. In addition, the carbon nanotubes are used preferably in an amount of 1-5 parts by weight based on 100 parts by weight of the cation exchange membrane. When carbon nanotubes are used in an amount less than 1 part by weight, it is not possible to improve mechanical strength sufficiently. When carbon nanotubes are used in an amount larger than 5 parts by weight, the cation exchange membrane may have decreased ion conductivity.

In another aspect, there is provided a method for manufacturing an ion exchange membrane, including the steps of: forming a triblock copolymer in which a first sulfonated block, cross-linking block and a second sulfonated block are arranged sequentially; hydrogenating a part of the doubles bonds of the cross-linking block; sulfonating at least one of the sulfonated blocks; and carrying out cross-linking of the cross-linking block to obtain a cross-linked sulfonated triblock copolymer.

The method for manufacturing an ion exchange membrane according to the present invention uses no fluoropolymer. In addition, according to an embodiment of the present invention, the cross-linking and sulfonation steps may be carried out simultaneously by using acetic sulfate. Thus, it is possible to simplify the overall process and to reduce the cost.

Figure 4:
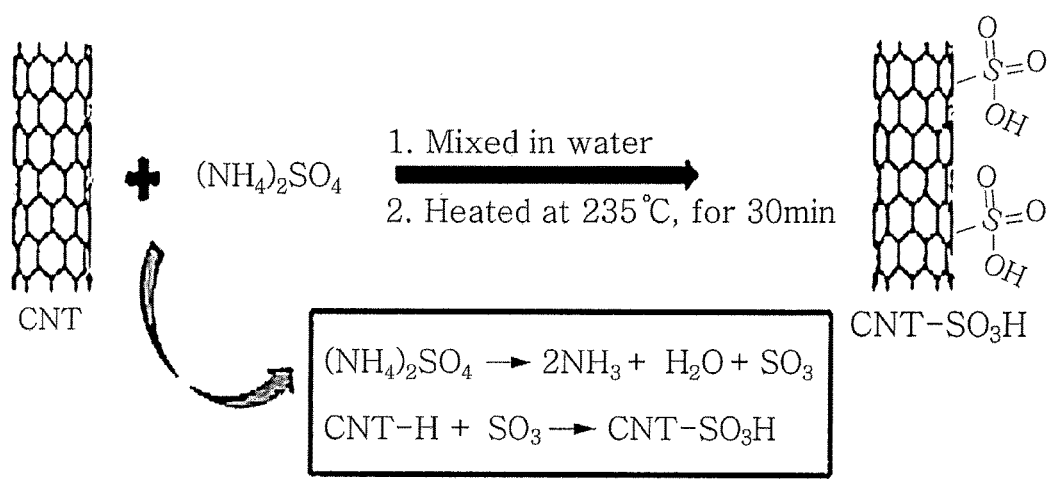
FIG. 4 is a schematic view illustrating the method for preparing sulfonated carbon nanotubes according to the present invention and the surface state of carbon nanotubes before and after the preparation thereof.

The method for manufacturing an ion exchange membrane according to the present invention may further include a step of adding carbon nanotubes, preferably sulfonated carbon nanotubes to the cross-linked sulfonated triblock copolymer in order to improve ion conductivity and mechanical strength. Herein, as shown in FIG. 4, the sulfonated carbon nanotubes can maintain their optimized state by mixing them with ammonium sulfate in the presence of water and heating the mixture at a temperature of 200-250° C. for 25-40 minutes.

After adding the sulfonated carbon nanotubes to the cross-linked sulfonated triblock copolymer, the resultant composition is applied to a support through a known casting or coating process, followed by drying, to obtain an ion exchange membrane. Then, acid treatment may be carried out and the acid treatment may include dipping an electrolyte membrane into aqueous sulfuric acid solution, treating the electrolyte membrane at the boiling point, washing the electrolyte membrane with deionized water, and allowing the electrolyte membrane to stand under an indoor condition for about 24 hours. The ion exchange membrane obtained by the above process may be used for a fuel cell or redox flow batter, preferably for a vanadium redox flow battery. The ion exchange membrane according to the present invention has excellent chemical stability, mechanical strength and ion conductivity, while providing high ion selectivity.

MODES OF THE INVENTION

The present invention will be explained in more detail with reference to examples and experiments. However, it is apparent to those skilled in the art that the following examples and experiments are for illustrative purposes only and not intended to limit the scope of this disclosure.

Example 1

Manufacture of Ion Exchange Membrane 1

A triblock copolymer of polystyrene (PS) and polyisoprene (PI) is prepared according to the anion polymerization process as described in Balsara, N. P. et al. (Macromolecules 1994, 27(5), 1216-1220) (Examples 1-1 to 1-3).

In addition, sulfonation and cross-linking are carried out according to the method as described in J, Yeo, et al. (nanotechnology, 2012). The sulfonation and cross-linking are carried out simultaneously as follows. First, 1 g of PS-PI or PS-PI-PS is dissolved into 40 mL of 1,2-dichloroethane and maintained at 40° C. under nitrogen atmosphere. Next, 1.8 mL of acetic anhydride is mixed with 5.4 mL of 1,2-dichloroethane, the mixture is cooled to 0° C., and 0.5 mL of 96% sulfuric acid is added thereto to obtain acetic sulfate. The obtained acetic sulfate is introduced intermediately to the polymer/1,2-dichloroethane mixture to carry out reaction at 40° C. The sulfonation degree is controlled depending on reaction time. For example, SL=17±3 mol % for a reaction time of 0.25 h, SL=37±4 mol % for a reaction time of 1 h, SL=49±2 mol % for a reaction time of 4 h, and SL=63±3 mol % for a reaction time of 6 h. The reaction mixture is quenched by using 20 mL of 2-propanol.

The triblock copolymer is polymerized in such a manner that PS-PI-PS are arranged sequentially and the copolymer has a molecular weight of 30.3-62.4 kg/mol. All of the resultant polymers have a polydispersity index (PDI) less than 1.03. The selective hydrogenation of polyisoprene blocks is carried out in a 2 L Parr high-pressure reactor in the presence of a Ni—Al catalyst dissolved in cyclohexane at 83° C. under a pressure of 420 psi. The Ni—Al catalyst is obtained by mixing 50 mL of 0.1M nickel 2-ethylhexanolate in cyclohexane (Aldrich) with 20 mL of triethylaluminum in hexane (Aldrich) per 0.5 g of a PI chain, In general, a diblock copolymer undergoes hydrogenation to about 90% during the first reaction, while a triblock copolymer undergoes hydrogenation to 80%, which is determined through $^1$H-NMR. To obtain a desired hydrogenation level (HL), hydrogenation is repeated many times. All $^1$H-NMR tests are carried out by using 300 MHz Bruker AV300 spectrophotometer and the tests demonstrate that styrene is not hydrogenated but is retained stably. In addition, gel permeation chromatography (GPC) is carried out to determine that there is no cleavage of chains. At this time, both sulfonation of PS and cross-linking of the remaining PI double bonds are carried out simultaneously by using acetic sulfate.

After a triblock copolymer is obtained, it is dissolved into 5 wt % THF solution and the solution is subjected to solvent casting to form a cation exchange membrane, which has a thickness of 30-60 μm. The cation exchange membrane is dried at room temperature under $N_2$ blanket for about 3 days, and then further dried at 50° C. in a vacuum oven for 5 days.

Comparative Examples

Example 1 is repeated to obtain D10[20] ion exchange membrane (Comparative Example 1), except that a diblock copolymer is formed. Comparative Example 2 is commercially available Nafion 117 ion exchange membrane.

Example 2

Evaluation and Comparison of Quality of Ion Exchange Membrane

The following Table 1 shows the physical properties of the ion exchange membranes according to Example 1 and Comparative Examples. In the sample names, D refers to a diblock copolymer having a PS-PI form and T refers to a triblock copolymer having a PS-PI-PS form. In addition, the number next to D or T means the molecular weight (kg/mol) of a PS block before it is subjected to sulfonation and the number in a bracket means a sulfonation degree.

TABLE 1

| Sample names | Molecular weight (kg/mol) | Sulfonation Degree (mol %) | IEC value (mmol/g) | Room temperature conductivity (s/cm) at RH = 95% | Nano-structure |
|---|---|---|---|---|---|
| Example 1-1 (T6[47]) | 6.5-12.6-6.8 | 47 | 1.85 | 0.1 | Lamella |
| Example 1-2 (T12[30]) | 15.3-25-15.9 | 30 | 1.49 | 0.07 | Lamella |
| Example 1-3 (T12[63]) | 18.6-24.6-19.2 | 63 | 2.47 | 0.08 | Lamella |
| Comp. Ex. 1 (D10[20]) | 11.7-18.6 | 22 | 0.74 | 0.021 | Lamella |
| Comp. Ex. 2 (Nafion 117) | 1.1 | — | 0.99 | 0.1 | — |

In Table 1, 'sulfonation degree' means a molar percent of sulfonate with which PS blocks are substituted, and the ion conductivity of a cation exchange membrane significantly depends on sulfonation degree. A sulfonation degree is calculated by using the molar ratio of sulfonate-substituted PS to non-substituted PS through $^1$H-NMR. The relationship between the ion conductivity and sulfonation degree of a cation exchange membrane is determined by measuring conductivity with an impedance analyzer, while the sulfonation degree is varied under humidified environment (RH=95%). In the case of the ion exchange membrane having no physical cross-linking point according to Comparative Example 1, it easily loses mechanical stability in aqueous solution. Thus, it is possible to determine that such an ion exchange membrane is problematic in terms of durability when it is used as a VRFB separator. On the contrary, the ion exchange membranes (Examples 1-1 to 1-3) including a triblock copolymer according to the present invention show high durability. As shown in Table 1, it can be seen that the ion exchange membranes (Examples 1-1 to 1-3) according to the present invention show hydrogen conductivity comparable to the hydrogen conductivity of commercially available Nafion 117.

In addition, the cation exchange membranes according to the present invention are determined for ion selectivity. Each of the cation exchange membranes according to the present invention and commercially available Nafion 117 is determined through ICP-AES, before and after charging/discharging, for the $V^{4+}$ ion concentration remaining in the separator after a permeability test. The results are shown in FIG. 1 and FIG. 2.

Figure 2:
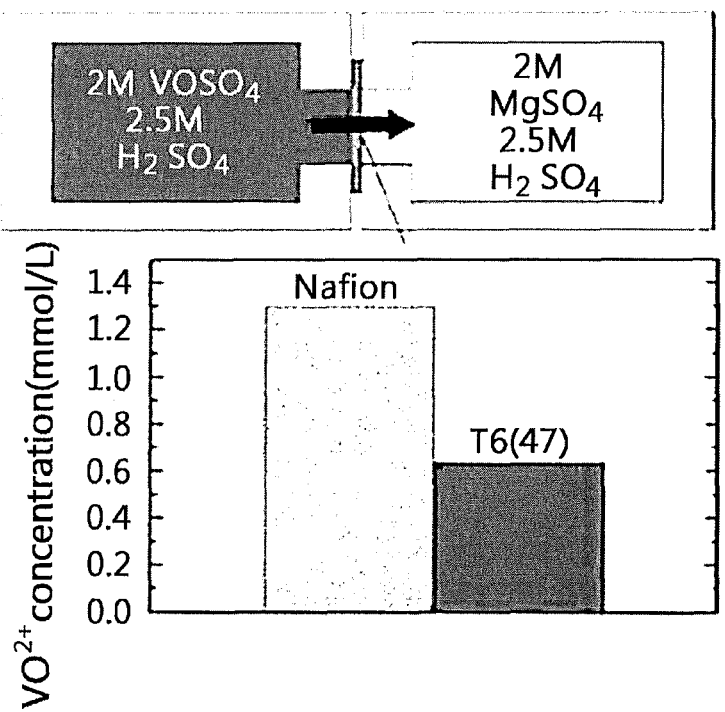
FIG. 2 shows the results of a test for $V^{4+}$ ion permeability of T6(47) according to an embodiment of the present invention and Nafion as control in order to determine the efficiency of reducing cross-over of the ion exchange membrane according to the present invention.

FIG. 1 illustrates the remaining $V^{4+}$ ion concentration adsorbed by a separator after charging/discharging. It can be seen that when using the cation exchange membranes according to the present invention, the remaining $V^{4+}$ ion concentration after charging/discharging is reduced approximately by a factor of 3 as compared to commercially available Nafion 117. Similarly, it can be seen from the permeability test results of FIG. 2 that the cation exchange membranes according to the present invention reduces cross-over to about ½ of the cross-over occurring in the case of Nafion 117. It is thought that the above results are derived from the nanometer-size ion channel formed in the cation exchange membranes according to the present invention and functioning to prevent cross-over of $V^{4+}$ ions. Therefore, when using the cation exchange membranes according to the present invention, it is possible to reduce cross-over and to improve the durability of a redox flow battery and battery quality.

Then, the effect of ion conductivity of the cation exchange membrane according to the present invention upon the capacity of a battery is determined. Cation exchange membranes having different sulfonation degrees and different conductivities are prepared and used to determine the capacity of a VRFB cell. As electrodes, carbon felt and graphite foil are used. Then, $V^{3+}$ and $V^{4+}$ solutions are injected to both electrodes so that they may be used as anolyte and catholyte. The test is carried out at a rate of 20 mA/cm$^2$.

Figure 3:
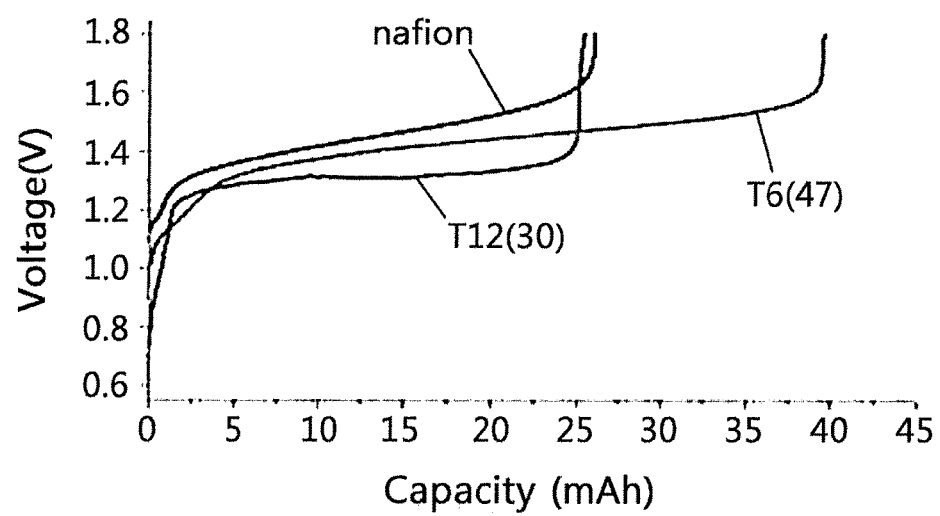
FIG. 3 is a charging graph illustrating the effect of the ion conductivity of T6(47) and T12(47) according to the embodiments of the present invention and that of Nafion as control upon the battery.

During the test, comparison of the first charge capacity is carried out. The results are shown in FIG. 3. As a result, it can be seen that the cross-linked sulfonated triblock copolymer cation exchange membranes T6(47) and T12(30) according to the present invention are differentiated from commercially available Nafion 117 in terms of charging characteristics. In other words, as can be seen from FIG. 3, T12(30) that has an IEC value of 1.49 mmol/g and a room temperature conductivity of 0.07 S/cm shows a charge capacity similar to the charge capacity of Nafion. However, T6(47) having a higher IEC value of 1.85 mmol/g and a higher room temperature conductivity of 0.1 S/cm provides an improvement of charge capacity by about 70%.

Example 3

Manufacture of Ion Exchange Membrane Including Sulfonated Carbon Nanotubes

A cation exchange membrane to which sulfonated carbon nanotubes (CNT) are added is manufactured to increase the mechanical durability of the ion exchange membrane according to the present invention. Commercially available carbon nanotubes (carbon nanotube single walled, Aldrich) are used and sulfonation is carried out as shown in FIG. 4.

It is possible to determine that CNT surfaces are substituted effectively with sulfonate through a significant difference in dispersibility of CNT in polymer before and after the sulfonation. The degree of sulfonation with sulfonate may be controlled with ease by adjusting the reaction ratio between CNT and $(NH_4)_2SO_4$. CNT is a well-known hydrophobic material and thus cannot be dispersed in solution with ease. However, when CNT surfaces are substituted with sulfonate at a high ratio, the dispersibility in solution becomes significantly different. This suggests that CNT surfaces are substituted with sulfonate at a high ratio. The presence of $SO_3H$-CNT dispersed homogeneously in the ion exchange membrane functions to improve both the mechanical stability and ion conductivity of the ion exchange membrane at the same time.

Example 4

Figure 5:
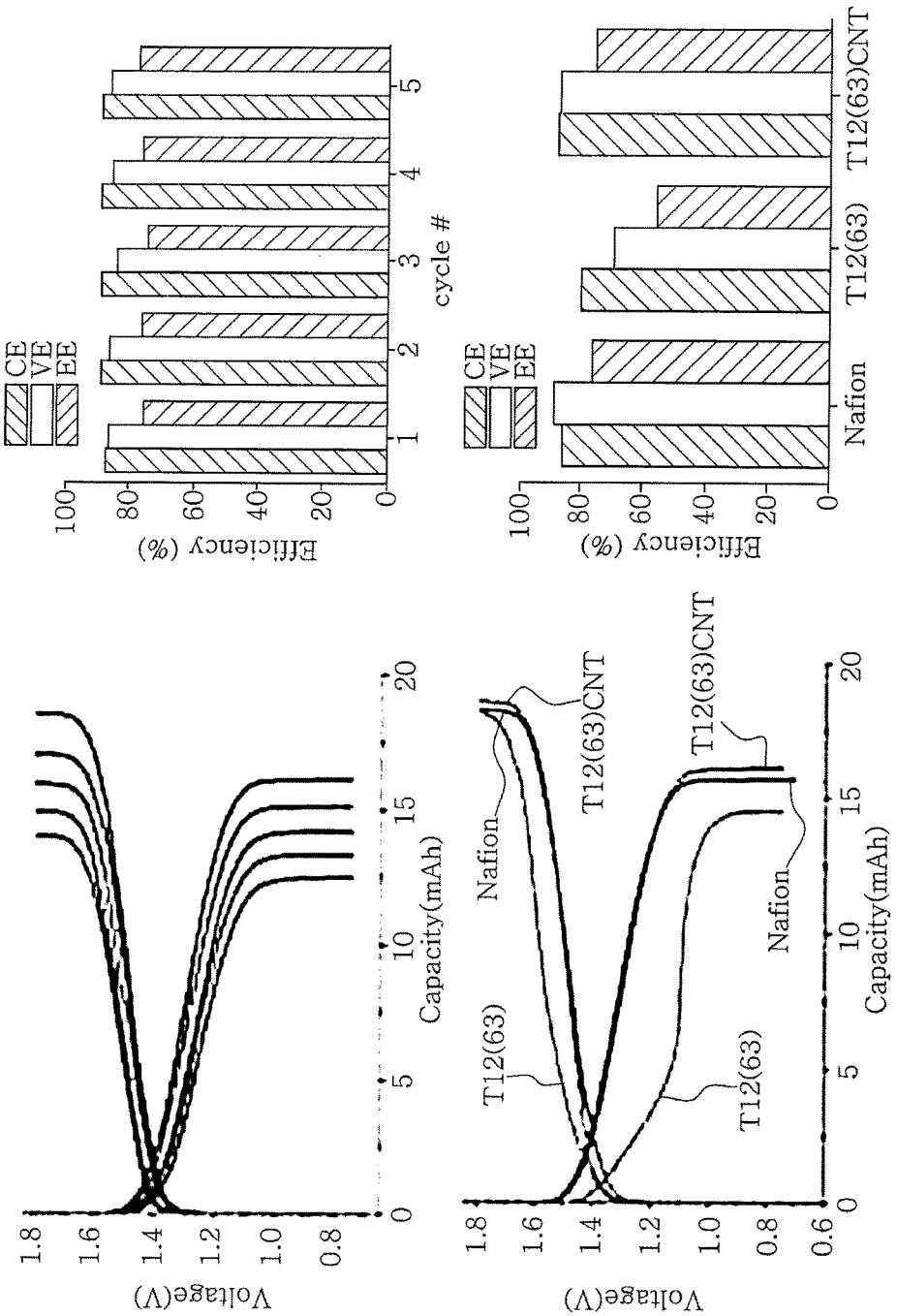
FIG. 5 is a charging/discharging graph illustrating the effect of the ion conductivity of T12(63) according to an embodiment, that of T12(63)CNT containing sulfonated carbon nanotubes and that of Nafion as control upon battery capacity.

Evaluation and Comparison of Quality of Ion Exchange Membrane Including Sulfonated Carbon Nanotubes As shown in FIG. 5, the ion exchange membrane including about 3 wt % of $SO_3H$-CNT added to the cross-linked sulfonated triblock copolymer T12(63) according to the present invention is used to carry out a charge/discharge test under the same condition. The test is carried out at 0.75V-1.8V and the charge/discharge rate is fixed to 20 mA/cm$^2$ at this time. Then, $V^{3+}$ and $V^{4+}$ solutions are injected to both electrodes, and the separator is inserted between both electrodes to provide a battery. Five cycles are carried out in total and variations in characteristics of the battery are observed continuously by calculating CE (capacity efficiency), VE (voltage efficiency) and EE (energy efficiency) for each step. As shown in FIG. 5, the ion exchange membrane including sulfonated carbon nanotubes significantly improves the quality of a battery. As can be seen from the upper part of the results of FIG. 5, the problem of degradation of electric capacity during repeated charge/discharge according to the related art is alleviated significantly. It is thought that the above results are derived from significant improvement of durability provided by CNT dispersed well in the polymer.

In addition, the lower part of the results of FIG. 5 show comparison of the first charge/discharge curve of the separator including CNT with that of Nafion 117 and that of T12(63) separator together with the results of CE, VE and EEE values. Particularly, it can be seen that degradation of electric capacity during repeated charge/discharge cycles is alleviated and stable charge/discharge efficiency is provided. When comparing the first charge/discharge curve of the separator with that of Nafion 117 and that of T12(63), it can be seen that the separator has the highest electric capacity and its overall efficiency is very high. The above results suggest that the CNT whose surfaces are substituted with sulfonate is present effectively in the cation exchange membrane, and the CNT significantly improves the durability of the ion exchange membrane and positively affects the ion conductivity thereof.

Example 5

Manufacture of Ion Exchange Membrane 2

A triblock copolymer of polystyrene (PS) and polyisoprene (PI) is prepared according to the anion polymerization process as described in Balsara, N. P. et al. (Macromolecules 1994, 27(5), 1216-1220) (Examples 1-1 to 1-3).

In addition, sulfonation and cross-linking are carried out according to the method as described in J, Yeo, et al. (nanotechnology, 2012). The sulfonation and cross-linking are carried out simultaneously as follows. First, 1 g of PS-PI or PS-PI-PS is dissolved into 40 mL of 1,2-dichloroethane and maintained at 40° C. under nitrogen atmosphere. Next, 3 mL of acetic anhydride is mixed with 9 mL of 1,2-dichloroethane, the mixture is cooled to 0° C., and 0.9 mL of 96% sulfuric acid is added thereto to obtain acetic sulfate. The obtained acetic sulfate is introduced intermediately to the polymer/1,2-dichloroethane mixture to carry out reaction at 40° C. The sulfonation degree is controlled depending on reaction time. For example, SL=17±3 mol % for a reaction time of 0.25 h, SL=37±4 mol % for a reaction time of 1 h, SL=49±2 mol % for a reaction time of 4 h, and SL=63±3 mol % for a reaction time of 6 h. The reaction mixture is quenched by using 20 mL of 2-propanol and agitated for 30 minutes.

The reaction mixture is subjected to air-blowing to allow complete evaporation of 1,2-dichloroethane, and then dissolved into THF. Dialysis is carried out by using a cellulose dialysis membrane and distilled water. Herein, dialysis is continued for 10 days until pH of distilled water becomes the same as pH of pure distilled water. Then, the product is dried at 25° C. in a vacuum oven for 7 days and the sulfonation degree is calculated through $^1$H-NMR.

The triblock copolymer is polymerized in such a manner that PS-PI-PS are arranged sequentially and the copolymer has a molecular weight of 25-50 kg/mol. All of the resultant polymers have a polydispersity index (PDI) less than 1.03.

Then, $(NH_4)_2SO_4$ is dissolved into deionized water in an amount larger than the amount of CNT (carbon nanotube, single walled, Sigma-Aldrich, 704121), and CNT is dispersed therein sufficiently by using a sonicator for 5 cycles (30 minutes per cycle). Water is evaporated completely by using a reduced pressure distillation instrument, the mixture is heated by using an oil bath to 235° C., and reaction is carried out for 30 minutes. After the reaction, the product is purified and dried.

After the triblock copolymer is obtained, sulfonated CNT used in an amount of 5 wt % and $Al_2O_3$ are dissolved into 0.25 mL of DMAC (dimethylacetamide) and dispersed therein by sonication. The well-dispersed solution is poured to a Teflon-made frame and the solution is evaporated at 65° C. in an oven for 3 days. After carrying out drying at 25° C. for 7 days and at 65° C. for 3 days in a vacuum oven, the frame is removed and the ion exchange membrane is used. The resultant ion exchange membrane has a thickness of 120-150 μm.

Example 6

Evaluation and Comparison of Quality of Ion Exchange Membrane 2

1) Comparison of Quality in Static Cell and Flow Cell

Figure 6:
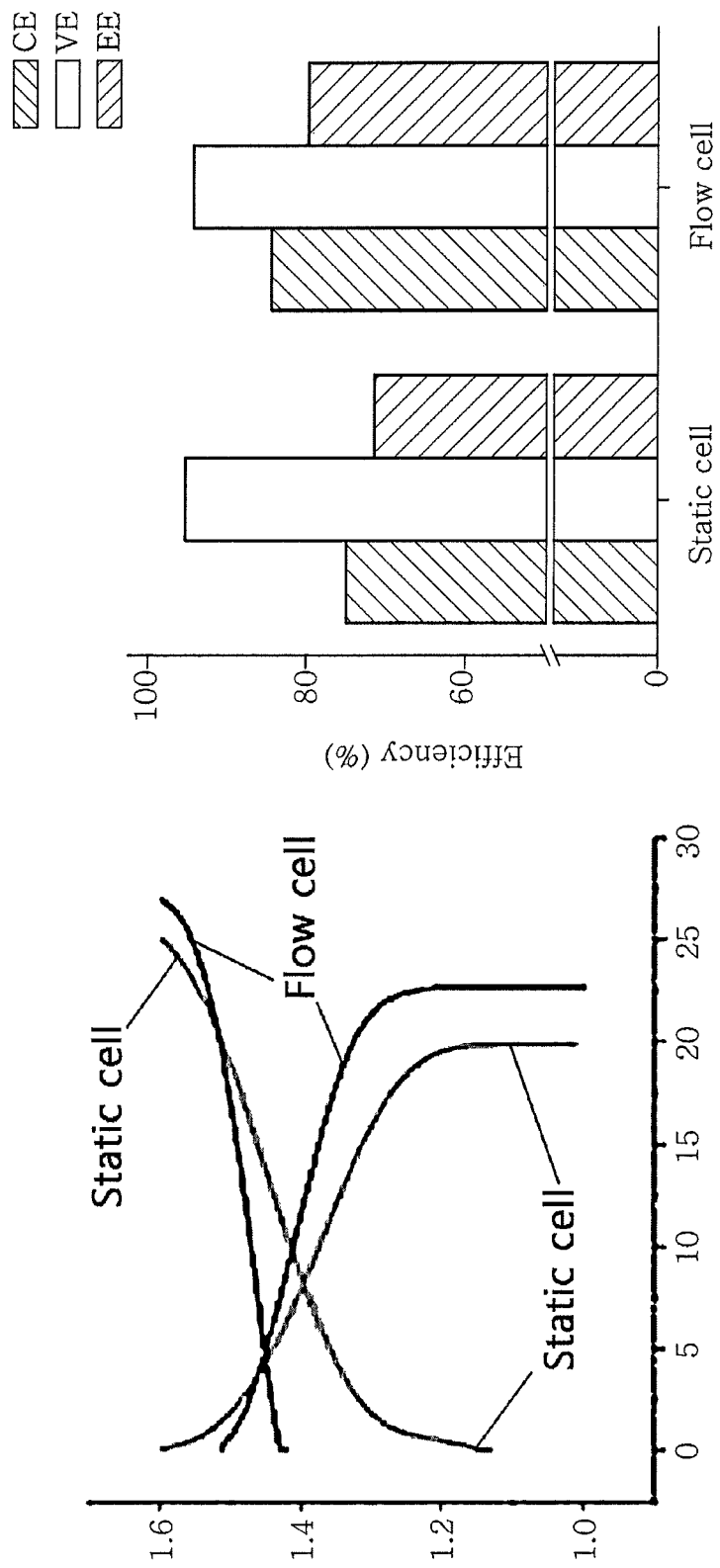
FIG. 6 is a charging/discharging graph illustrating a difference in quality of a separator in a flow battery and static battery when using Nafion.

To determine how much the quality of a separator in a flow cell is improved as compared to the quality of the separator in a static cell, Nafion is used to carry out a test at the same current density (10 mA/cm$^2$). After the test, it can be seen that the initial capacity in a flow cell is increased by about 12% (the left side of FIG. 6). In addition, the cell shows significantly improved efficiency as demonstrated by CE (75→84%), VE (95→95%) and EE (71→80%) (the right side of FIG. 6). In addition, as can be seen from a difference in voltage in the charge/discharge curves, the cell shows significantly decreased polarization (the left side of FIG. 6). The above results suggest that the electrolytes more efficiently participate in redox reaction under the environment of a flow system, and are not present locally at one side of the electrodes but are present in a homogeneous state.

Figure 7:
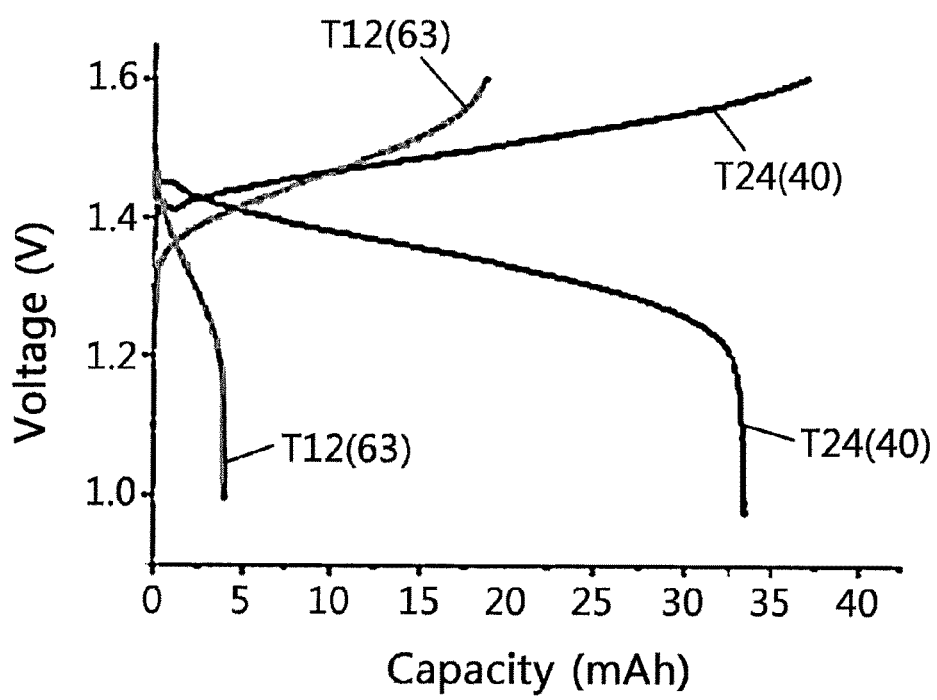
FIG. 7 is a charging/discharging graph of T12(63) according to an embodiment and T24(40) having an increased molecular weight.

2) Variations in Electrochemical Properties Depending on Mechanical Strength of Ion Exchange Membrane To carry out comparison of electrochemical properties depending on mechanical strength of an ion exchange membrane, the molecular weight of an ion exchange membrane is increased and the properties are observed. As a result, it can be seen that ion exchange membranes having a different molecular weight provide significantly different electrochemical properties. In the case of T12(63), it shows a discharge curve relatively shorter than its charge curve and provides very low capacity. It is thought that the ion exchange membrane having low mechanical strength causes a rapid drop in voltage during discharge. However, in the case of the ion exchange membrane (T23(40)) having an increased molecular weight, it shows significantly improved capacity and stable charge and discharge curves (see FIG. 7). The above results suggest that the mechanical strength of an ion exchange membrane is an important factor that improves the stability and quality of a battery.

While the exemplary embodiments have been shown and described, it will be understood by those skilled in the art that various changes in form and details may be made thereto without departing from the scope of this disclosure as defined by the appended claims. Therefore, it is intended that the scope of the present invention includes all embodiments falling within the spirit and scope of the appended claims.

What is claimed is:

1. An ion exchange membrane comprising:
 a cross-linked sulfonated triblock copolymer in which a first sulfonated block, a crosslinking block and a second sulfonated block are arranged sequentially, wherein the crosslinking block is a polyisoprene block; and
 dispersed sulfonated carbon nanotubes comprising sulfonates directly attached to a surface of the carbon nanotube, wherein the sulfonates are present in an amount of 0.1-70 parts by weight based on 100 parts by weight of carbon nanotubes.

2. The ion exchange membrane according to claim 1, wherein the sulfonated block is a polystyrene block.

3. The ion exchange membrane according to claim 2, wherein the polystyrene block has a molecular weight of 6.5-19.2 kg/mol.

4. The ion exchange membrane according to claim 1, wherein the cross-linking is formed merely in the cross-linking block.

5. The ion exchange membrane according to claim 1, wherein the cross-linking block has a cross-linking degree of 0.5-5%.

6. The ion exchange membrane according to claim 1, wherein the sulfonation is carried out in the sulfonated blocks and the sulfonated blocks have a sulfonation degree of 25-65%.

7. The ion exchange membrane according to claim 1, wherein each single monomer block of the block copolymer has a molecular weight of 20-150 kg/mol.

8. The ion exchange membrane according to claim 1, wherein the sulfonated carbon nanotubes are present in an amount of 1-5 parts by weight based on 100 parts by weight of the ion exchange membrane.

9. The ion exchange membrane according to claim 1, wherein the polyisoprene block has a molecular weight of 12.6-25 kg/mol.

10. A redox flow battery comprising the ion exchange membrane as defined in claim 1.

11. The redox flow battery according to claim 10, which is a vanadium redox flow battery.

12. A method for manufacturing an ion exchange membrane, comprising the steps of:
 forming a triblock copolymer in which a first sulfonated block, a cross-linking block and a second sulfonated block are arranged sequentially, wherein the cross-linking block is a polyisoprene block;
 hydrogenating a part of the doubles bonds of the cross-linking block;
 sulfonating at least one of the sulfonated blocks;
 carrying out cross-linking of the cross-linking block to obtain a cross-linked sulfonated triblock copolymer; and
 dispersing sulfonated carbon nanotubes comprising sulfonates directly attached to a surface of the carbon nanotube to the cross-linked sulfonated triblock copolymer, wherein the sulfonates are present in an amount of 0.1-70 parts by weight based on 100 parts by weight of carbon nanotubes.

13. The method according to claim 12, wherein the sulfonated blocks are polystyrene blocks.

14. The method according to claim 12, wherein the crosslinking and sulfonation are carried out simultaneously by using acetic sulfate.

15. The method according to claim 12, wherein the sulfonated carbon nanotubes are obtained by mixing carbon nanotubes with aqueous ammonium sulfate and heating the mixture at a temperature of 200-250° C. for 25-40 minutes.

* * * * *

UNITED STATES PATENT AND TRADEMARK OFFICE
CERTIFICATE OF CORRECTION

PATENT NO. : 10,374,246 B2  
APPLICATION NO. : 15/038814  
DATED : August 6, 2019  
INVENTOR(S) : Ji Hyun Kong et al.

Page 1 of 1

It is certified that error appears in the above-identified patent and that said Letters Patent is hereby corrected as shown below:

On the Title Page

Assignee (73):  
Add the following (second) Assignee:  
--Postech Academy-Industry Foundation, Gyeongsanguk-do, Korea--

Signed and Sealed this  
Seventh Day of July, 2020

Andrei Iancu  
*Director of the United States Patent and Trademark Office*